July 16, 1968   B. T. HARWICK   3,393,313
RADIATION MEASUREMENT INSTRUMENT HAVING STABILIZATION MEANS
Filed June 1, 1964   4 Sheets-Sheet 1

INVENTOR.
BURTON T. HARWICK
BY
AGENT

July 16, 1968  B. T. HARWICK  3,393,313
RADIATION MEASUREMENT INSTRUMENT HAVING STABILIZATION MEANS
Filed June 1, 1964  4 Sheets-Sheet 2

INVENTOR.
BURTON T. HARWICK
BY
AGENT

INVENTOR.
BURTON T. HARWICK
BY
Donald J. Ellingsberg
AGENT

July 16, 1968 B. T. HARWICK 3,393,313
RADIATION MEASUREMENT INSTRUMENT HAVING STABILIZATION MEANS
Filed June 1, 1964 4 Sheets-Sheet 4

INVENTOR.
BURTON T. HARWICK
AGENT

United States Patent Office 3,393,313
Patented July 16, 1968

3,393,313
RADIATION MEASUREMENT INSTRUMENT
HAVING STABILIZATION MEANS
Burton T. Harwick, Northridge, Calif., assignor to North American Rockwell Corporation, a corporation of Delaware
Filed June 1, 1964, Ser. No. 371,353
19 Claims. (Cl. 250—43.5)

The present invention relates to an improved radiation measurement instrument, and more particularly to an improved radiation measurement instrument having circuitry means for stabilizing the radiation instrument.

Measurement instruments or devices using radiation sources have found particular use in industrial applications where measurements of density, thickness, volume and the like are either intermittently or continuously made. In these prior art radiation measurement instruments, radiation source decay has necessitated frequent calibration and adjustment of the instruments to compensate for the natural decay of the sources and to maintain desired instrument accuracy. Such calibration and adjustment generally requires that the instrument be temporarily removed from use and calibrated or adjusted by using a standard or known radiation source. This is inconvenient and economically undesirable because of the lost instrument time.

One radiation measurement instrument subject to normal source decay and the need for calibration or adjustment is the radiation fuel gauge disclosed in U.S. Patent No. 2,952,774, issued Sept. 13, 1960, and assigned to the same assignee as the present invention. Radiation gauges measure the quantity or mass of fluid in a tank or container by utilizing the attenuation of radiation emanating from radiation sources by the atoms of a fluid through which the radiation passes. One or more radiation sources and a detector are associated with a tank containing the fluid so that radiation passes through the tank to the detector. The greater the quantity of fluid in the tank, the greater the attenuation of radiation passing through the tank, and the smaller the total signal generated in the detector of the fluid gauge.

Since the radiation sources continually undergo natural decay, the total radiation which passes through the fluid in the tank decreases with time and this affects the instrument accuracy. Frequently calibration of these instruments is therefore necessary to correct for the radiation source decay to ensure optimum instrument accuracy and reliability.

Accordingly, it is an object of the invention to provide an improved radiation instrument having increased accuracy and reliability.

Another object is to provide an improved radiation instrument for measuring mass directly.

It is also an object to provide means for stabilizing a radiation instrument and for compensating for radioactive source decay.

Yet another object is to provide a radiation instrument which is highly accurate and stable over extended time periods relative to the half-life of a radiation source.

A similar object is to provide an improved radiation instrument including means for stabilizing the count rate measurement obtained from a radiation source.

A further object is to provide an improved radiation fluid gauge including means to allow the count rate obtained from a radiation source to change as the parameter being measured changes without adversely affecting the accuracy of the measurement.

Briefly, in accordance with one form of the invention, the improved radiation measurement instrument has a detector means responsive to random-in-time radiation pulses emanating from an external radiation source which pass through a mass to the detecor means and radiation pulses emanating from an internal radiation source which do not pass through the mass. The energy level of the external radiation source is substantially different from the energy level of the internal radiation source in the preferred embodiment of the invention. The detector means is responsive to the radiation pulses emanating from the external and internal radiation sources and generates respective measured and control signals having equivalent energy level peaks which are fed to an intermediate circuit means which includes a pulse converter means and an error signal means where the equivalent signals are sorted according to their respective energy levels and fed to a plurality of channels. At least first and second channels of the plurality of channels are adapted to carry predetermined portions of the total random-in-time control pulses that develop the energy level peak of the control signal. The intermediate circuit means is responsive to the measured signal and the control signal and generates a respective measured signal and a feedback control signal. A display means is responsive to the measured signal and displays the measured signal as an indication of the total mass. The feedback control signal has a selectively variable energy level that reflects the division of the total random-in-time control pulses sorted by the intermediate means. At least one of the detector and intermediate means is responsive to the feedback control signal which automatically adjusts the radiation instrument to satisfy a predetermined energy level pulse sorting schedule so that the first and second channels carry the predetermined portions of the total random-in-time control pulses received by the instrument.

Further objects, features, and the attending advantages of the present invention will be apparent with regard to the following description read in conjunction with the accompanying drawings in which.

Figure 2:
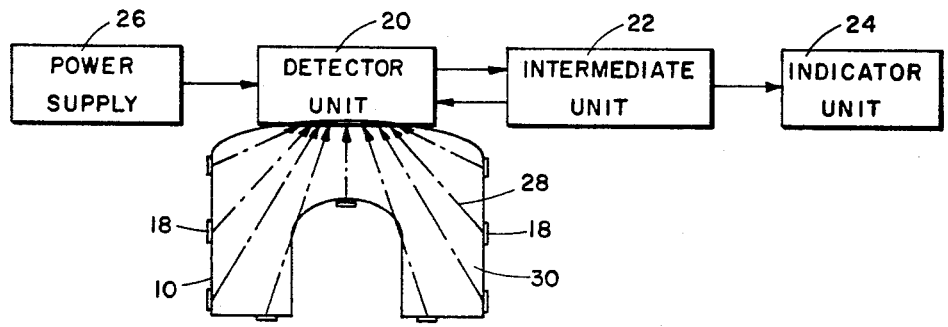
FIGURE 2 is a block diagram of the invention as shown by FIGURE 1 as positioned relative to a fluid tank from the aircraft of FIGURE 1.
Figure 1:
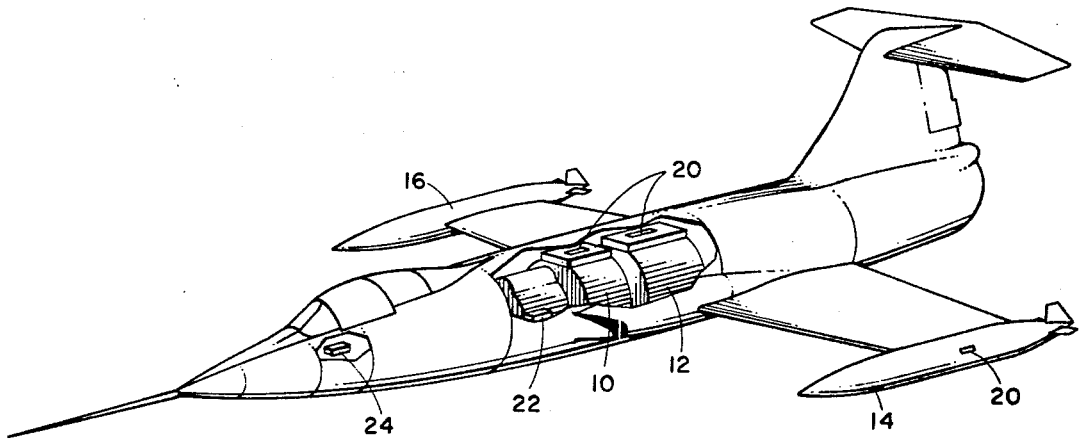
FIGURE 1 is a perspective view, partly broken away, of a specific embodiment of the improved radiation measurement instrument of the invention.

Referring to the drawings, and particularly to FIGURES 1 and 2, one form of the new and improved radiation instrument is shown in a specific operating embodiment, a conventional aircraft. The aircraft has, inter alia, tanks 10, 12, 14, and 16 which can have various shapes and fluid capacities. Associated with each of these tanks are one or more external radiation sources 18 and a radiation transducer or detector unit 20 which is electrically connected with an intermediate unit 22 and an indicator unit 24. A conventional battery or suitable power supply 26 provides voltage to the radiation instrument. The radiation sources and detector unit are preferably positioned outside the tank and do not physically penetrate the tank. It is contemplated that either the radiation sources or the detector unit, or both, can be physically positioned inside the tank since internal positioning does not adversely affect the new and improved radiation instrument of the invention.

FIGURE 2 shows the aircraft tank 10 of FIGURE 1 in cross-section and with an arrangement of similar radiation sources 18 suitably spaced about the perimeter of the tank. The external radiation sources 18 and the detector unit 20 are preferably positioned so that radiation emanating from each source passes to the detector unit along paths 28 which lie partly within the tank. One or more of the radiation paths, dependent upon the physical attitude of the aircraft, will always pass through fluid 30 contained in the tank. The greater the quantity of fluid in the tank, the greater the attenuation of radiation passing therethrough, and the smaller the signal generated by the detector unit.

Figure 3:
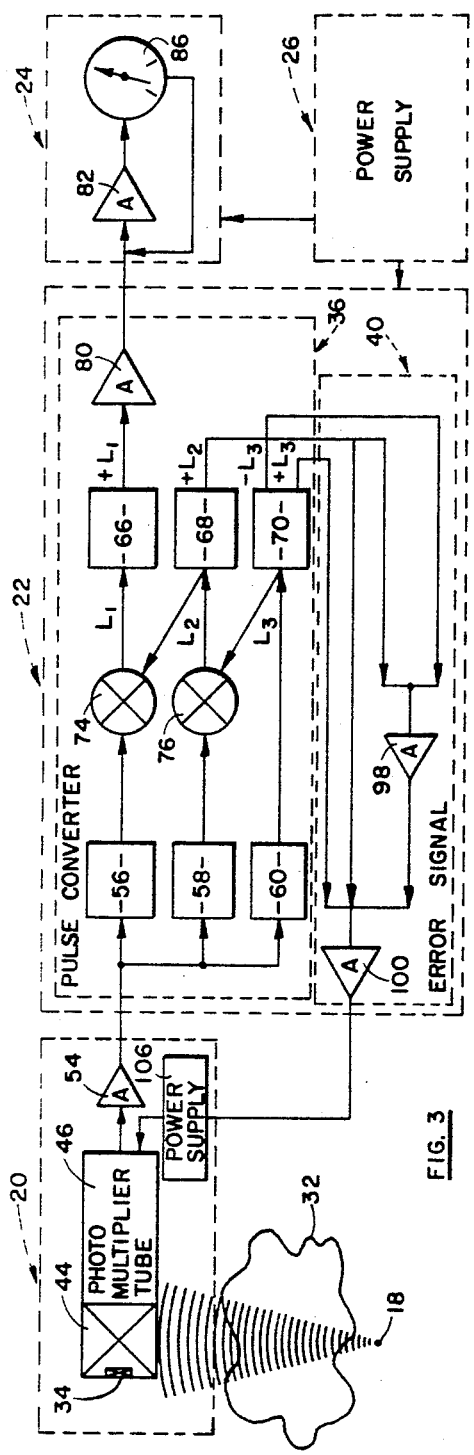
FIGURE 3 is a detailed block diagram of the improved radiation measurement instrument of the invention.

The detailed block diagram of the improved radiation instrument as shown by FIGURE 3 has one external radiation source 18 illustrated for clarity and ease of description. Radiation from the external source 18 passes through a mass 32 to the detector unit 20 which also receives radiation from an internal radiation source 34. The radiation from internal radiation source 34 does not pass through the mass 32. In the preferred embodiment, the energy level of the external radiation source 18 is substantially different from the energy level of the internal radiation source 34. It is contemplated that the energy level of the external radiation source can be greater than or less than the energy level of the internal radiation source. The detector unit 20 is responsive to the input pulses from the external radiation source 18 and the control pulses from the internal radiation source 34, and generates equivalent electrical pulses or signals. These equivalent signals are fed to a pulse converter circuit 36 where they are sorted and selectively fed as a measured signal to the display unit 24 and as an error correcting signal to error signal circuit 40. Portions of the signals fed to the pulse converter circuit 36, as will be hereinafter described, preclude any pulse other than a pulse representing a measured intelligence signal from appearing at the display unit 24. The error signal or detecting circuit in the intermediate unit 22 of FIGURE 3 generates a feedback signal to the detector unit 20. The feedback signal automatically adjusts the gain of the detector unit to correct for natural radiation source decay of external source 18, component instability, and the like.

Figure 4:
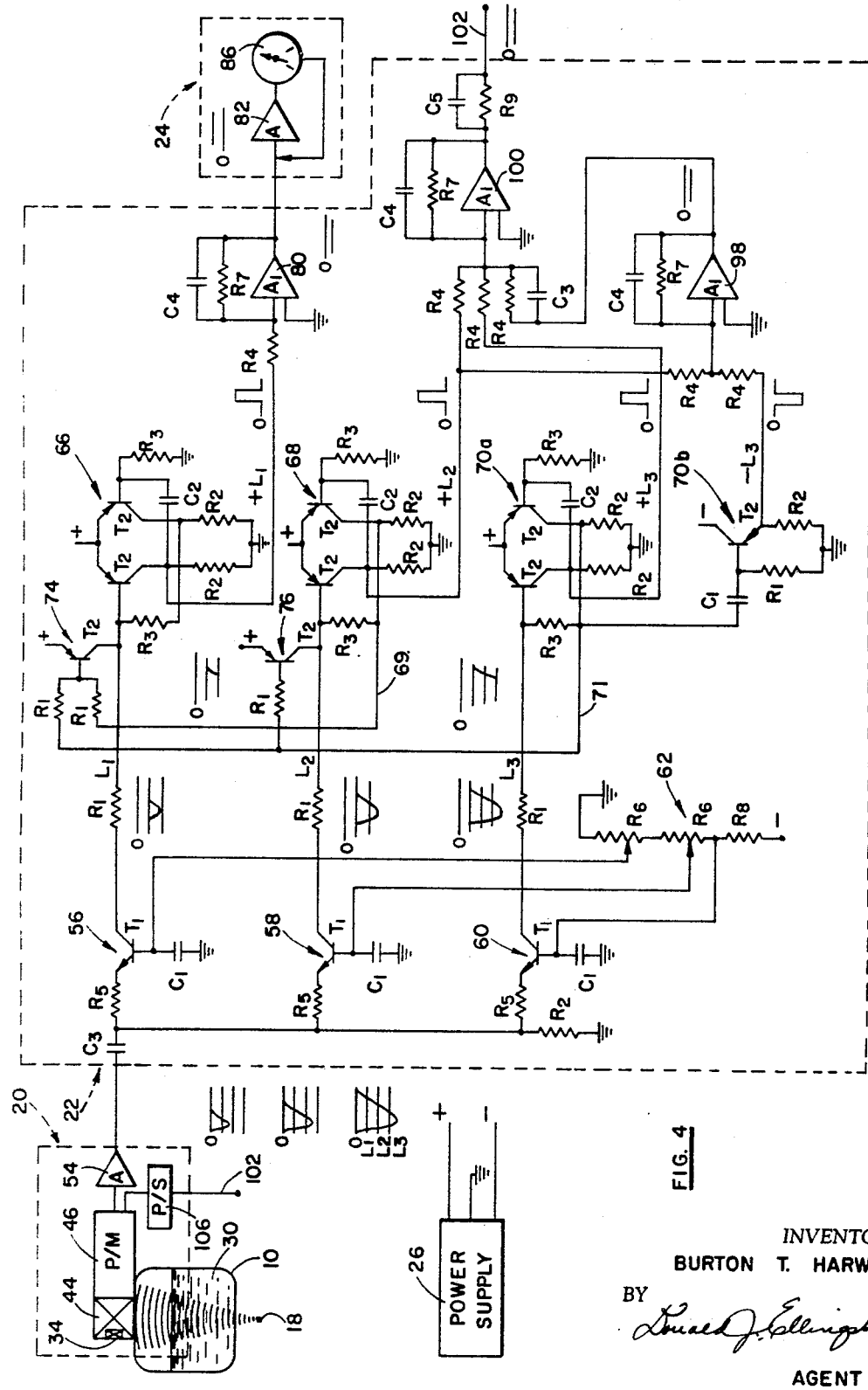
FIGURE 4 is an electrical schematic of the invention.

The electrical schematic of FIGURE 4 is a specific embodiment of the improved radiation instrument. Again, one external radiation source 18 is shown associated with a mass such as tank 10, although a plurality of suitably positioned radiation sources such as shown by FIGURE 2 are generally preferred for fluid measurement in such tanks. In the specific embodiment of FIGURE 4, the external radiation source 18 is preferably a source of gamma radiation. The gamma radiation can originate from a radioactive isotope such as cesium-137, cobalt-60, and the like.

Gamma radiation from the external gamma emitter source 18 passes through the walls of tank 10 and the fluid 30 contained therein to a scintillation crystal 44 of the detector unit 20. Scintillation crystal 44, which is preferably formed from sodium iodide and the like, is optically coupled to a conventional photomultiplier tube 46.

Crystal 44 also receives radiation from the internal radiation source 34 which adjoins the scintillation crystal. In the embodiment as shown by FIGURE 4, internal radiation source 34 is a seeded crystal positioned generally at the geometric center of the scintillation crystal 44. Internal radiation source 34 may also be a plug insert containing a suitable radioactive isotope having a relatively long half-life. The internal radiation source may also be a radiation compound such as radioactive paint, i.e. a relatively thin source, spread on the surface of the scintillation crystal. However, it is preferred that the internal radiation source 34 be positioned with regard to the scintillation crystal 44 so that scintillations from the internal radiation source are optically coupled to the scintillation crystal body 44. This facilitates precise control over energy loss from the radiation source to the scintillation crystal body.

Radiation source 34 is preferably an alpha emitter, such as the radioactive isotope americium-241. It is contemplated that other sources of alpha radiation can be used as well as combinations of alpha sources, e.g. americium-241 and curium-244, or americium-241 and plutonium-236. Such combinations would preferably yield or nearly approximate a desired half-life characteristic; for example, a combination of radioactive isotopes to approximate the natural decay curve of the external source or sources.

Figure 5:
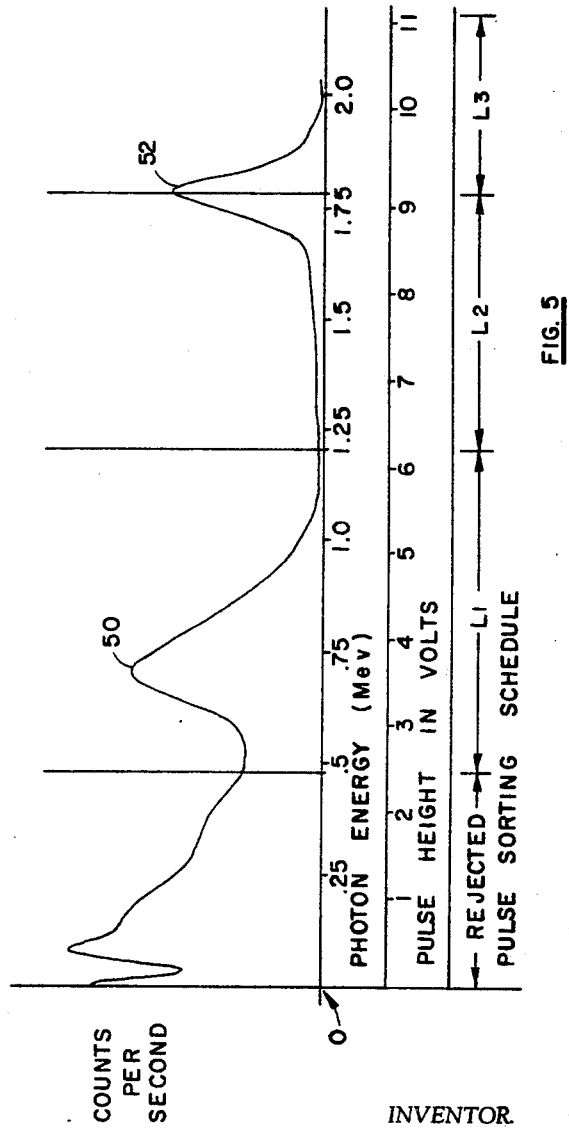
FIGURE 5 is a plot of one radiation spectrum from the improved radiation instrument of FIGURES 3 and 4.

FIGURE 5 illustrates a typical spectrum detected by the radiation measurement instrument as shown by FIGURE 4 when the external radiation sources 18 are cesium-137 and the internal radiation source 34 is americium-241. The gamma photon peak 50 of cesium-137 is approximately 0.66 mev. (million electron volts), and the alpha scintillation peak 52 of americium-241 has approximately a gamme equivalent energy of 3 mev. Americium-241 emits a 5.5 mev. alpha with a 470-year half-life; however, the lower light yield from alpha particle absorption by the scintillation crystal 44 results in a light output from the scintillation crystal equivalent to a 3 mev. gamma photon. Thus, the scintillation peaks 50 and 52 have substantially different energy levels so that each can be readily distinguished and processed by the improved circuitry of the present invention.

The amplitude pulse sorting schedule of FIGURE 5 has defined energy ranges $L_1$, $L_2$, and $L_3$. The electrical pulses which are random in time with varying energy amplitudes are sorted according to the schedule by the originating energy of each pulse. Those pulses having an energy range less than some arbitrary value, depending on the instrument application and the particular radiation sources used, are rejected. In the specific embodiment of FIGURE 4, the gamma photon peak 50 falls within energy range $L_1$ which represents radiation passing through the fluid 30 in tank 10, while the alpha scintillation peak 52 is divided at the energy division line between energy ranges $L_2$ and $L_3$ so that ranges $L_2$ and $L_3$ have equal counting pulses present for purposes to be described hereinafter. The gamma photon peak 50 may include when desirable a portion of the scattered radiation which is normally rejected.

Referring again to FIGURE 4, the radiation developed light pulses from the scintillation crystal 44 corresponding to the input pulses from the external radiation source 18 and the control pulses from the internal radiation source 34 are received by the photomultiplier tube 46 and fed as electrical pulses to a linear amplifier 54. The random pulses are amplified therein in a conventional manner and fed to the pulse height discriminator or sorter circuit 36 where the electrical input and control pulses are separated according to the pulse amplitude sorting schedule shown by FIGURE 5.

The pulse height discriminator circuit 36 includes similar transistors 56, 58, and 60 which are connected in parallel with the linear amplifier 54. The bias voltage to the base of each transistor is suitably adjusted by circuit 62 so that conduction through each semiconductor will take place only when an electrical pulse from amplifier 54 satisfies the pulse sorting schedule of FIGURE 5.

Pulse height discriminator 56 is adjusted so that only those electrical input pulses whose originating energy falls within the energy range $L_1$ of the sorting schedule are permitted to pass through the discriminator to channel $L_1$. Pulse height discriminators 58 and 60 pass only those incoming electrical control pulses whose energy falls within ranges $L_2$ and $L_3$ to channels $L_2$ and $L_3$, respectively.

In FIGURE 4, an incoming electrical input pulse whose energy level falls within energy range $L_1$ (see FIGURE 5) is permitted to pass through discriminator 56 to a pulse shaper 66. Similarly, incoming control pulses whose energy levels correspond to energy ranges $L_2$ and $L_3$ pass through the respective discriminators 58 and 60 to pulse shapers 68 and 70. Pulse shapers 66, 68, and 70 invert and square the sorted input and control pulses in a conventional manner to a uniform size and shape. Pulse shaper 70 generates a pair of similar pulses that correspond in size and shape but have opposite polarity, i.e. pulse shaper 70a generates a pulse opposite in polarity from that pulse generated from pulse shaper 70b.

Since the incoming control pulse that triggers the pulse shaper 68 on channel $L_2$ could also trigger pulse shaper 66 on channel $L_1$, a blanking pulse comprising the leading portion of control pulse $L_2$ is fed on lead 69 from pulse shaper 68 to a gate 74 on channel $L_1$. Gate 74 is preferably a gating transistor. The blanking pulse varies the bias of the gating transistor 74 in the embodiment shown, so that pulse $L_2$ is blanked out and will not pass on channel $L_1$ to trigger pulse shaper 66. Input pulse $L_2$ corresponding to energy range $L_2$ therefore passes only on channel $L_2$ and triggers pulse shaper 68. In a similar manner, a blanking pulse comprising the leading portion of control pulse $L_3$ is fed on lead 71 from pulse shaper 70a to gate 74 and a similar gate 76 which blank out the unwanted pulses on channels $L_1$ and $L_2$ so that control pulse $L_3$ passes only on channel $L_3$ to trigger pulse shaper 70.

In the embodiment of FIGURE 4, the incoming pulses on channels $L_1$, $L_2$, and $L_3$ are negative in polarity and when inverted by the pulse shaper circuits 66, 68, and 70 become positive pulses. Pulse shaper 70b generates negative $L_3$ pulses which correspond in both size and shape to the positive $L_3$ pulses from shaper 70a. The inverted and squared input pulses on channel $L_1$ represent the measured intelligence signal which is fed to a conventional integrating operational amplifier 80. These input pulses correspond to the energy range $L_1$ of the sorting schedule of FIGURE 5, and represent the mass attenuated gamma radiation from the external radiation source 18. The shaped and squared input pulses on channel $L_1$ are processed by the amplifier 80 which sums the input pulses and feeds a DC analog voltage to a conventional servo-amplifier 82. The servoamplifier 82 drives the readout indicator 86 of the indicator unit 24 for a direct reading of the mass quantity of fluid present in tank 10.

Figure 6:
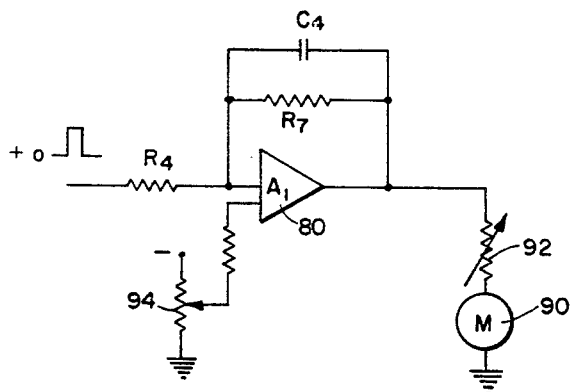
FIGURE 6 is a fragmentary electrical schematic of one modification of the readout portion of the schematic as shown by FIGURE 4.

Turning now to FIGURE 6, one modification of the readout indicator unit 24 feeds the DC voltage output from amplifier 80 to a conventional meter 90 through variable resistor 92 which permits full-scale adjustment of the meter. A suitable zero adjust for the meter is provided by potentiometer 94 and associated circuitry. It is also contemplated that the random input pulses on channel $L_1$ from pulse shaper 66 can be converted to a digital output signal which can be fed either to a digital storage unit for subsequent readout or directly to a digital readout unit.

The error signal circuit 40 in the intermediate unit 22 receives the inverted and squared control pulses from pulse shapers 68, 70a, and 70b. Since the pulse sorting schedule as shown by FIGURE 5 divides the alpha peak 52 into equal or nearly equal energy levels, channel $L_2$ and channel $L_3$ each carry approximately one-half of the total control pulses which originate from the internal radiation source 34. Pulse shaper 68 feeds positive control pulses to the input of an integrating amplifier 98 which correspond to range $L_2$, and shaper 70b feeds negative control pulses to the input of amplifier 98 which correspond to range $L_3$. The control pulses fed from shapers 68 and 70b are summed by the integrating amplifier 98 and a corresponding DC voltage signal is generated which can be zero or can vary about zero. This D.C. voltage signal is fed from amplifier 98 to the input of a similar integrating amplifier 100. Amplifier 100 sums the positive control pulses fed from shapers 68 and 70a, adds the DC voltage signal from amplifier 98, and multiplies the resulting signal by some constant. The resulting signal is a DC voltage error signal.

In the circuit shown by FIGURE 4, the DC voltage error signal is fed from integrating amplifier 100 on lead 102 to a separate battery or suitable power supply 106 in the detector unit 20 which is connected to photomultiplier tube 46. The feedback error signal automatically adjusts the gain of the power supply 106 and thereby the photomultiplier tube, so that the value of the error signal generated by the error signal circuit 40 is adjusted to zero. This automatic adjustment of the gain of the detector unit 20 corrects for component instability, and the like. The restored system gain of the radiation instrument as shown by FIGURES 3 and 4 is now stable until a new error signal is generated and fed to the detector unit 20. It is contemplated that the error signal could also be fed on lead 102 to the input of a conventional variable gain amplifier (not shown) which is series connected between the linear amplifier 54 and the intermediate unit 22.

Figure 7:
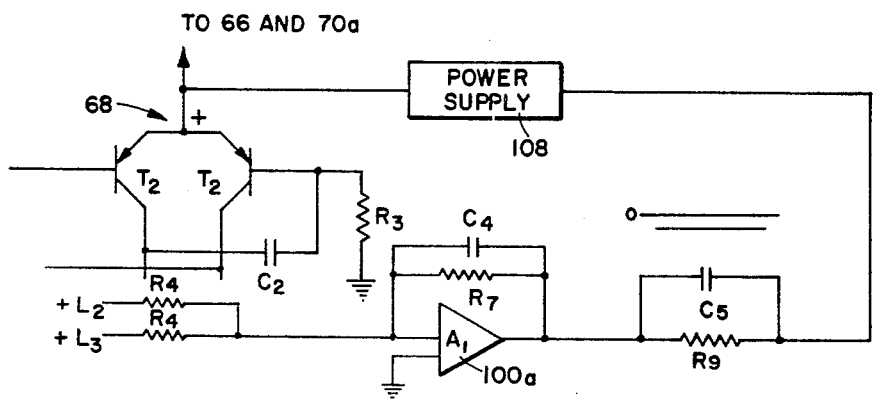
FIGURE 7 is a fragmentary electrical schematic of a circuit which may be utilized as a modification of the intermediate unit portion of the schematic as shown by FIGURE 4.

Referring now to FIGURE 7, the signals $L_2$ and $L_3$ from circuits 68 and 70 can also be fed through amplifier 100a to a series connected power supply 108 whose output to the B+ voltage input of pulse shaper circuits 66, 68, and 70 stabilizes the radiation instrument by feeding back a signal for compensating for source decay. Automatic adjustment of the voltage gain of pulse shapers 66, 68, and 70 is accomplished by increasing the B+ voltage applied to pulse shapers 66, 68, and 70 sufficiently to affect the desired stabilization of the radiation instrument and correct for the natural decay of the radiation sources. The circuit of FIGURE 7 is preferably utilized with the circuit of FIGURE 4, however, the source stabilization circuit may also be utilized with other stabilized radiation measuring circuits similar to FIGURE 4. In this manner automatic adjustment for both component instability and instability resulting from decay of the external source may be accomplished.

Equilibrium in the system, i.e. an error signal of zero voltage, as described and schematically shown in the embodiment of FIGURE 4 is established when the DC voltage error signal from amplifier 100 satisfies the division of the alpha peak 52 as shown by FIGURE 5. There will be only one scintillation peak with exactly the same pulse rate as the pulse rate originating from the reference alpha peak. For example, assume that there is a loss of gain in the detector unit 20. This tends to shift the pulses downscale on the sorting schedule shown by FIGURE 5. A downscale shift of pulses places an increased number of pulses in energy range $L_2$ and an increased number of incoming pulses on channel $L_2$. The increase in pulses on channel $L_2$ when processed by the error signal circuit 40 will generate a negative DC voltage signal output from amplifier 98. The negative DC voltage signal sums through amplifier 100 and generates an increased feedback error signal to the detector unit 20 which adjusts the gain of the power supply 106 to compensate for the original loss in gain of the detector unit 20. The adjustment of the gain shifts the spectrum upscale from energy range $L_2$ to range $L_3$, to again satisfy the desired division of the alpha peak 52.

In an extreme example, assume that the system gain is high and all the pulses of alpha peak 52 are in energy range $L_3$ of the schedule shown by FIGURE 5. In addition, assume that the gamma photon peak 50 shifts upscale from range $L_1$ into range $L_2$ so that the pulses in range $L_2$ by some coincidence exactly equal the pulses in range $L_3$. The output from amplifier 98 would be incorrectly balanced at zero. However, my improved radiation measurement instrument automatically corrects for this improbable occurrence since the total number of pulses on channels $L_2$ and $L_3$ summed at the input to amplifier 100 would now be approximately double that normally required for instrument equilibrium. The error signal output from amplifier 100 to the detector unit 20 would then reduce the gain of the power supply. This would shift the system downscale toward the desired division of the alpha peak 52 which correspondingly represents the desired equilibrium point.

Figure 8:
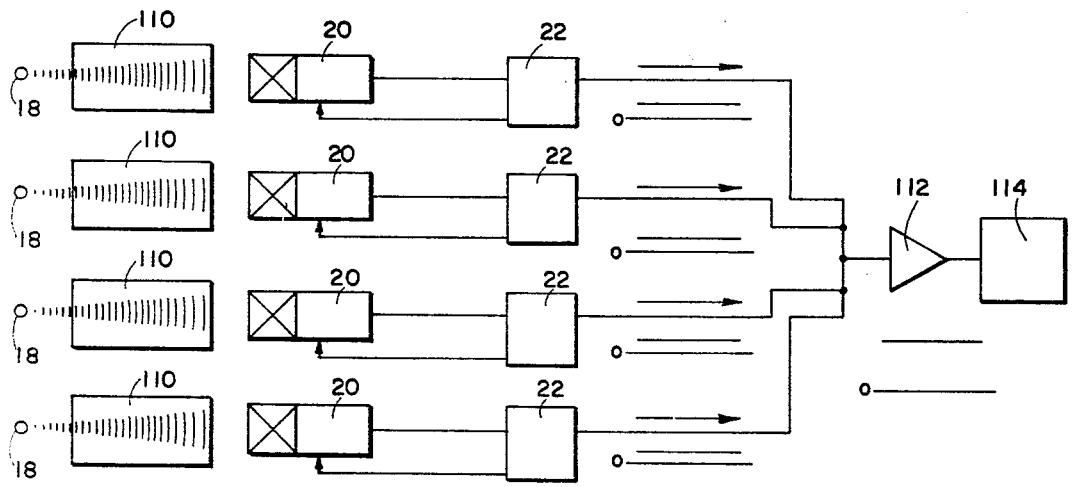
FIGURE 8 is a block diagram of the radiation measurement instrument associated with a plurality of fluid tanks for the embodiment as shown by FIGURE 1.

FIGURE 8 shows one arrangement of a plurality of similar tanks 110, such as the tank shown by FIGURE 4, and the improved radiation instrument of the invention associated with each tank. The measured intelligence signal, which reflects the mass of fluid in each tank, is fed from each instrument as a voltage signal to a conventional summing amplifier 112 which generates a total intelligence signal that reflects the total mass of fluid in all the tanks. A readout indicator unit 114, such as the readout indicator previously described, is responsive to the total signal and indicates the total fluid in all the tanks. When desired, the circuit can also be arranged so that the total fluid in any one tank or combination of tanks is indicated by the indicator unit. It is contemplated that in certain tank or mass arrangements wherein a plurality of radiation instruments are necessary, such as shown by FIGURE 8, the automatic stabilization of one instrument can be suitably coupled to the remaining instruments for corresponding control thereof. Although the accuracy of such an arrangement would be lessened compared to a system wherein each instrument is self-stabilized, duplicate circuitry associated with the error detecting circuit in each of the remaining instruments would be eliminated.

By way of example, the value of resistors R and capacitors C, and the type of transistors T and summing amplifiers A1 employed in the various circuits of the present invention may be as follows:

| | |
|---|---|
| R1=15K | C1=1 (35 v.) |
| R2=1.8K | C2=300 (50 v.) |
| R3=33K | C3=.8 (50 v.) |
| R4=51K | C4=5 (100 v.) |
| R5=2.2K | C5=.22 (100 v.) |
| R6=1K (Pot.) | T1=SD-251 or equivalent 2N2222 |
| R7=2M | T2=SD-252 or equivalent 2N2907 |
| R8=3.3K | A1=PP65 |
| R9=39K | |

As will be evidenced from the foregoing description, certain aspects of the invention are not limited to the particular details as illustrated and described, and it is contemplated that other modifications and applications will occur to those skilled in the art. It is, therefore, intended that the appended claims shall cover such modifications and applications that do not depart from the true spirit and scope of the invention.

What I claim as new and desire to secure by Letters Patent of the United States is:

1. An improved radiation measurement instrument comprising:
   (a) a first external source of radiation having a first energy level,
   (b) a second internal source of radiation having a second energy level,
   (c) a detector means responsive to random-in-time radiation pulses emanating from said first external and said second internal radiation sources and generating respective first measured and second control signals having equivalent energy level peaks,
   (d) an intermediate circuit means including a plurality of channels for sorting said first measured and second control signals according to respective energy levels, at least first and second channels of said plurality of channels adapted to carry predetermined portions of the total random-in-time control pulses that develop the energy level peak of said second control signal,
   (e) said intermediate circuit means responsive to said first measured and second control signals and generating a respective measured signal and a feedback control signal that has a selectively variable energy level that reflects the division of the total random-in-time control pulses sorted by said intermediate means, and
   (f) a display means responsive to said measured signal for displaying said measured signal,
   (g) at least one of said detector and intermediate means responsive to said feedback control signal to automatically adjust the radiation instrument so that said first and second channels carry said predetermined portions of the total random-in-time control pulses and satisfy a predetermined energy level pulse sorting schedule.

2. The improved radiation measurement instrument of claim 1 in which said intermediate circuit means includes a pulse converter means responsive to said first measured signal and generating said respective measured signal, and an error signal means responsive to said second control signal and generating said respective feedback control signal.

3. An improved radiation measurement instrument comprising:
   (a) first external and second internal sources of radiation having respective first and second energy levels, said first energy level substantially different than said second energy level,
   (b) detector means responsive to random-in-time radiation pulses emanating from said first external and second internal radiation sources and generating respective first measured and second control signals having equivalent energy level peaks,
   (c) pulse converter means responsive to said first measured and second control signals and including a plurality of channels for sorting said first measured and second control signals according to respective energy levels and generating respective measured and control signals,
   (d) display means responsive to said measured signal for displaying said measured signal,
   (e) at least first and second channels of said plurality of channels adapted to carry predetermined portions of the total random-in-time control pulses that are sorted by said pulse converter means and develop the energy level peak of said second control signal, and
   (f) error signal means responsive to said second control signal and generating a feedback control signal having a selectively variable energy level that reflects the division of the total random-in-time control pulses that are sorted by said pulse converter means to said first and second channels,
   (g) at least one of said detector and pulse converter means responsive to said feedback control signal to automatically adjust said first measured signal and said second control signal so that said first and second channels carry said predetermined portions of the total random-in-time control pulses and satisfy a predetermined energy level pulse sorting schedule.

4. The improved radiation measurement instrument of claim 3 in which said first and second channels carry substantially equal portions of the total random-in-time control pulses.

5. The improved radiation measurement instrument of claim 3 in which said second channel includes means responsive to said second control signal and generating equal control signal output pulses having opposite polarity, said error signal means responsive to said second control signal and said equal but opposite control signal output pulses and generating said feedback control signal.

6. An improved radiation measurement instrument for the measurement of mass in a plurality of tanks which comprises:
  (a) at least a first external and a second internal source of radiation associated with the tanks having respective first and second energy levels,
  (b) detector means associated with each tank responsive to random-in-time radiation pulses emanating from at least one of said first and second radiation sources and generating respective first measured and second control signals having equivalent energy level peaks,
  (c) said first measured and second control signals having substantially different energy levels,
  (d) an intermediate circuit means associated with each of said detector means including a plurality of channels for sorting said first measured and second control signals according to respective energy levels, at least first and second channels of said plurality of channels adapted to carry predetermined portions of the total random-in-time control pulses that develop the energy level peak of said second control signal,
  (e) said intermediate circuit means responsive to said first measured and second control signals and generating a respective measured signal and a feedback control signal that has a selectively variable energy level that reflects the division of the total random-in-time control pulses sorted by said intermediate means, and
  (f) a display means responsive to said measured signal for displaying said measured signal as the total measured mass in at least one of the tanks,
  (g) at least one of said detector and intermediate means responsive to said feedback control signal to automatically adjust the radiation instrument so that said first and second channels carry said predetermined portions of the total random-in-time control pulses and satisfy a predetermined energy level pulse sorting schedule.

7. An improved radiation measurement instrument for the measurement of mass in a plurality of tanks which comprises:
  (a) first external and second internal sources of radiation associated with each tank having respective first and second energy levels, said first energy level substantially different than said second energy level,
  (b) detector means associated with each tank responsive to random-in-time radiation pulses emanating from said first external and second internal radiation sources and generating respective first measured and second control signals having equivalent energy level peaks,
  (c) pulse converter means associated with each of said detector means responsive to said first measured and second control signals and including a plurality of channels for sorting said first measured and second control signals according to respective energy levels and generating respective measured and control signals,
  (d) display means responsive to said measured signal for displaying said signal as the total measured mass in at least one of the tanks,
  (e) each of at least first and second channels of said plurality of channels adapted to carry predetermined portions of the total random-in-time control pulses that are sorted by said pulse converter means and develop the energy level peak of said second control signal,
  (f) error signal means associated with at least one of said pulse converter means and responsive to said second control signal generating a feedback control signal having a selectively variable energy level that reflects the division of the total random-in-time control pulses that are sorted by said pulse converter means to said first and second channels,
  (g) at least one of said detector and pulse converter means associated with each tank responsive to said feedback control signal to automatically adjust said first measured signal and said second control signal so that said first and second channels carry said predetermined portions of the total random-in-time control pulses and satisfy a predetermined energy level pulse sorting schedule.

8. The radiation instrument of claim 1 in which said detector means is responsive to said feedback control signal.

9. The radiation instrument of claim 1 wherein said intermediate means includes an error signal means responsive to said second control signal for generating said feedback control signal, said intermediate means being responsive to said feedback control signal to compensate for the decay of one of said radiation sources.

10. The radiation instrument of claim 9 wherein said error signal means is responsive to a plurality of control signals to automatically adjust the voltage gain of second said intermediate means.

11. The radiation instrument of claim 1 in which said first measured signal has an equivalent energy level substantially different from said second control signal.

12. The radiation instrument of claim 2 wherein said pulse converter means is responsive to said feedback control signal.

13. The radiation instrument of claim 2 in which said detector means is responsive to said feedback control signal.

14. The radiation instrument of claim 1 in which said second control signal has an energy level greater than said first measured signal.

15. The radiation instrument of claim 1 in which said detector means is spaced from said first external radiation source and coupled to said second internal radiation source.

16. The radiation instrument of claim 15 in which said first external radiation source is a gamma emitter and said second internal radiation source is an alpha emitter.

17. The radiation instrument of claim 3 wherein said error signal means automatically adjusts the voltage gain of said pulse converter means to compensate for decay of one of said radiation sources.

18. The radiation instrument of claim 1 in which said detector means and said intermediate circuit means are responsive to said feedback control signal to compensate for decay of one of said radiation sources.

19. The radiation instrument of claim 6 wherein said detector means is responsive to said feedback control signal and including error signal means for generating an error signal, said intermediate circuit means being responsive to said error signal to change said second control signals to compensate for decay of one of said radiation sources.

References Cited

UNITED STATES PATENTS

| 3,056,885 | 10/1962 | Scherbatskoy | 250—71.5 |
| 3,179,801 | 4/1965 | Scherbatskoy | 250—71.5 |
| 3,183,353 | 5/1965 | Baldwin | 250—71.5 |
| 3,184,597 | 5/1965 | Scherbatskoy | 250—71.5 |
| 3,218,460 | 11/1965 | Scherbatskoy | 250—71.5 |
| 3,225,195 | 12/1965 | Scherbatskoy | 250—71.5 |
| 3,243,588 | 3/1966 | Scherbatskoy | 250—71.5 |

RALPH G. NILSON, *Primary Examiner.*

S. ELBAUM, *Assistant Examiner.*